DICODE DECODER TRANSLATING DICODE OR THREE-LEVEL DIGITAL DATA SIGNAL INTO TWO-LEVEL FORM

Filed Nov. 25, 1964

INVENTOR.
DONALD E. MACK
BY Joseph F. Rosenthal
AGENT
Anthony D. Cennamo
ATTORNEY Aug. 12, 1969 D. E. MACK 3,461,390

DICODE DECODER TRANSLATING DICODE OR THREE-LEVEL DIGITAL DATA SIGNAL INTO TWO-LEVEL FORM

Filed Nov. 25, 1964 2 Sheets-Sheet 2

INVENTOR.
DONALD E. MACK

BY Joseph J. Rosenthal
AGENT

Anthony D. Cennamo
ATTORNEY

United States Patent Office 3,461,390

Patented Aug. 12, 1969

3,461,390

DICODE DECODER TRANSLATING DICODE OR THREE-LEVEL DIGITAL DATA SIGNAL INTO TWO-LEVEL FORM

Donald E. Mack, West Webster, N.Y., assignor to Xerox Corporation, Rochester, N.Y., a corporation of New York Filed Nov. 25, 1964, Ser. No. 413,890
Int. Cl. H03k *5/20*
U.S. Cl. 328—119 5 Claims

ABSTRACT OF THE DISCLOSURE

A decoder circuit for use with input dicode signals. A received dicode signal is applied to the input of a transformer with a center tapped secondary and simultaneously peak rectified with the peak rectified voltage applied to the transformer center tap. Threshold detector circuits are connected to the other secondary taps to control the operation of a bistable multivibrator. The output signal is the original binary signal transmitted as the dicode signal.

This application relates to a pulse decoding circuit and method adapted for use in receiving data-sets.

Data-set is a term which has come to indicate the apparatus used to couple binary or digital type transmitters and receivers to a communications link. At the transmitter location, the data-set converts a two-level input signal, from a device such as a computer or a facsimile transmitter, into some other form in the same baseband frequency domain, but which is more compatible with the transmission link. At the receiving location, which may be thousands of miles away, the data-set receives the transmitted signals from the transmission link, and decodes them into a replica of the original two-level signal for utilization by a computer, facsimile receiver, or the like. The transmission link may also include various modulators and demodulators. The decoding problem at the receiving location is difficult because the transmission link, whatever its nature, is generally subject to fading and also adds various types of noise to the transmitted signal. In the past, decoding circuits have involved the use of accurate automatic gain control circuits to remove the effects of fading, followed by level detectors, such as Schmitt trigger circuits, to discriminate between signal pulses and noise pulses.

I have now discovered a simpler circuit which does not require provisions for automatic gain control and which permits the use of very simple level detecting means. I have accomplished this by simultaneously phase splitting and peak rectifying an input signal and adding one half of the peak rectified signal to a center tap of the phase splitter, thereby permitting signal pulses to be detected as zero voltage crossings of each of the two components of the phase split signal.

For a more detailed description of the invention, reference will be had to the accompanying drawings in which:

FIG. 1 represents an arbitrary two-level signal;

FIGS. 2*a* and 2*b* represent dicode versions of FIG 1;

Figure 1:
Figure 2A:
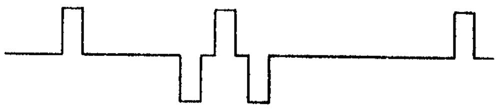
Figure 2B:
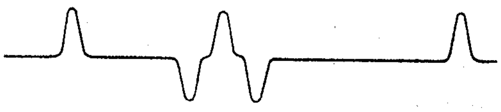

FIG. 1 represents an arbitrary two-level waveform representative of signals which are desired to be transmitted over long distances. FIG. 2*a* shows the waveform of FIG. 1 after passing through a common type of transmitting data-set. Each positive-going transition of FIG. 1 has been replaced by a positive pulse of fixed amplitude and each negative-going transition of FIG. 1 has been replaced by a negative pulse of the same amplitude. This type of coding is known as "dicode". It is a three-level type of signal with equal positive and negative pulses superimposed on a base line voltage. It is equally applicable to synchronous or non-synchronous signals. The positive and negative pulses ordinarily alternate, although this is not essential in terms of the present invention. The waveform of FIG. 2*a* is normally filtered, either before or during transmission, to remove the higher frequency components. This results in the waveform of FIG. 2*b*, which is representative of the waveform which would appear at a receiving data-set in the absence of fading or noise. It is the function of the receiving data-set to decode the waveform of FIG. 2*b* back to the waveform of FIG. 1. The signal pulses of FIG. 2*b* should be separated from noise pulses as reliably as possible, and with as little phase jitter as possible, in spite of varying signal amplitude. This invention is concerned with a circuit adapted to decode or translate a waveform of the type shown in FIG. 2*b* to a waveform of the type shown in FIG. 1.

Figure 3:
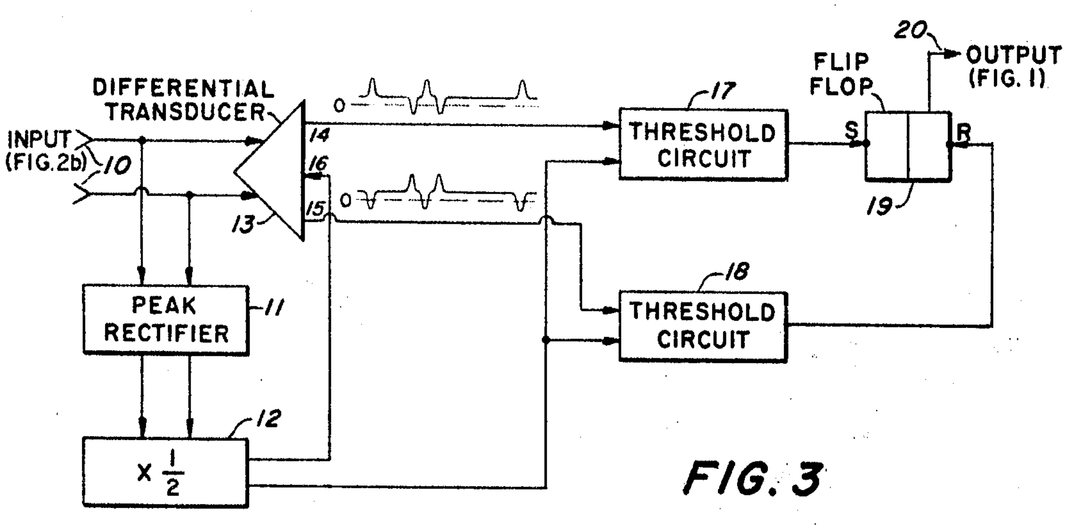
FIG. 3 is a block diagram of the circuit of my invention.

FIG. 3 is a generalized block diagram of my circuit. An input signal arrives on input signal lines 10 and is applied to a differential transducer 13. This is a device which converts the input signal into a pair of symmetrical push-pull signals which appear at terminals 14 and 15, as referenced to terminal 16. The input and output connections of transducer 13 should be conductively isolated from each other; that is, either or both of the input and output connections should be floating. If only the input of transducer 13 is floating, then it may be necessary to isolate input line 10 from ground by a coupling transformer or condenser, not shown. Transducer 13 may be a commercially available type of differential amplifier with isolated input and output terminals. A much simpler embodiment of transducer 13 will be described in connection with FIG. 4. Terminal 16 represents a form of center tap and is at a potential halfway between that of terminals 14 and 15. In other words, the potential on terminal 16 represents the average potential of terminals 14 and 15. Terminals 14 and 15 are connected to threshold circuits 17 and 18 respectively. These devices are designed to give a voltage output indicative of the sign of the difference between the input voltage applied thereto and a reference voltage, illustratively shown as ground potential.

A peak rectifier 11 is also connected to input signal line 10 and produces an output voltage equal to the peak signal level on line 10. Peak detector 11 can also be connected across the output of transducer 13, or any other point where the undecoded input signal is available. The indicated location is generally the simplest, however. Use of an A-C coupled rectifier can eliminate the need for D-C isolation in transducer 13. If the input signal on line 10 includes periodic synchronizing signals as required for the operation of facsimile or other receiving equipment, these will produce the necessary peak rectified voltage even in the absence of other information bearing input signals during standby intervals. The peak rectified voltage is multiplied by one half in circuit 12 and applied between terminal 16 of transducer 13 and the reference inputs of level detectors 17 and 18, assuming that the gain of transducer 13 is unity. For other gain values, circuit 12 should multiply by a value approximately equal to one half of the voltage gain of transducer 13. Accordingly, threshold circuits 17 and 18 compare their signal inputs with a voltage which is different from that on terminal 16 by a voltage equal to one half the peak input signal.

The operation of the circuit is readily understood in connection with the waveforms shown adjacent to terminals 14 and 15. The waveform appearing at terminal 14 is essentially the same as that appearing on input line 10 and, for simplicity, is shown as essentially the same waveform depicted in FIG. 2*b* except that the waveform is shifted upward by the same amount as the voltage applied to terminal 16. Thus, the zero volt level represents approximately half amplitude for negative-going pulses. Accordingly, circuit 17 detects the presence of a negative-going pulse at the half amplitude point, which is a value normally chosen to give the most reliable discrimination between signal pulses and noise. A negative-going pulse will be detected by circuit 17 in exactly the same way and at exactly the same time, regardless of the signal amplitude at input line 10. If the input signal level increases, the voltage at terminal 16 will correspondingly increase by just the amount required to insure that the half peak value of negative pulses at terminal 14 will still be zero volts. Similarly, if the input signal level decreases, then the voltage applied to terminal 16 will decrease, the waveform at terminal 14 will be displaced downward, and the half peak amplitude of negative-going pulses will still fall at zero volts. The time response of the voltage at terminal 16 to changes in amplitude at terminal 10 will be determined by the time constant of the peak rectifier circuit.

The waveform appearing at terminal 15 has the same D-C component as that at terminal 14, namely the voltage applied to terminal 16. The waveform itself is inverted with respect to that of terminal 14 so that the negative-going pulses which appear at this terminal correspond to positive-going pulses on input line 10. Thus, with respect to input line 10, circuit 17 detects one polarity of pulse while circuit 18 detects the other polarity. Each of circuits 17 and 18 detects at the half peak level, or other chosen value, substantially independently of the amplitude of the input signal. It can also be seen from an inspection of the illustrated waveforms that the time at which the terminals 14 and 15 cross the zero potential line is essentially independent of pulse amplitude, assuming that pulse shape remains constant. Thus, the signals produced by circuits 17 and 18 will not shift in phase as the input amplitude varies.

The detected signals produced by circuits 17 and 18 may be applied to the set S and reset R terminals respectively of a flip flop 19 to recreate the original binary waveform at output terminal 20 of flip flop 19.

Figure 4:
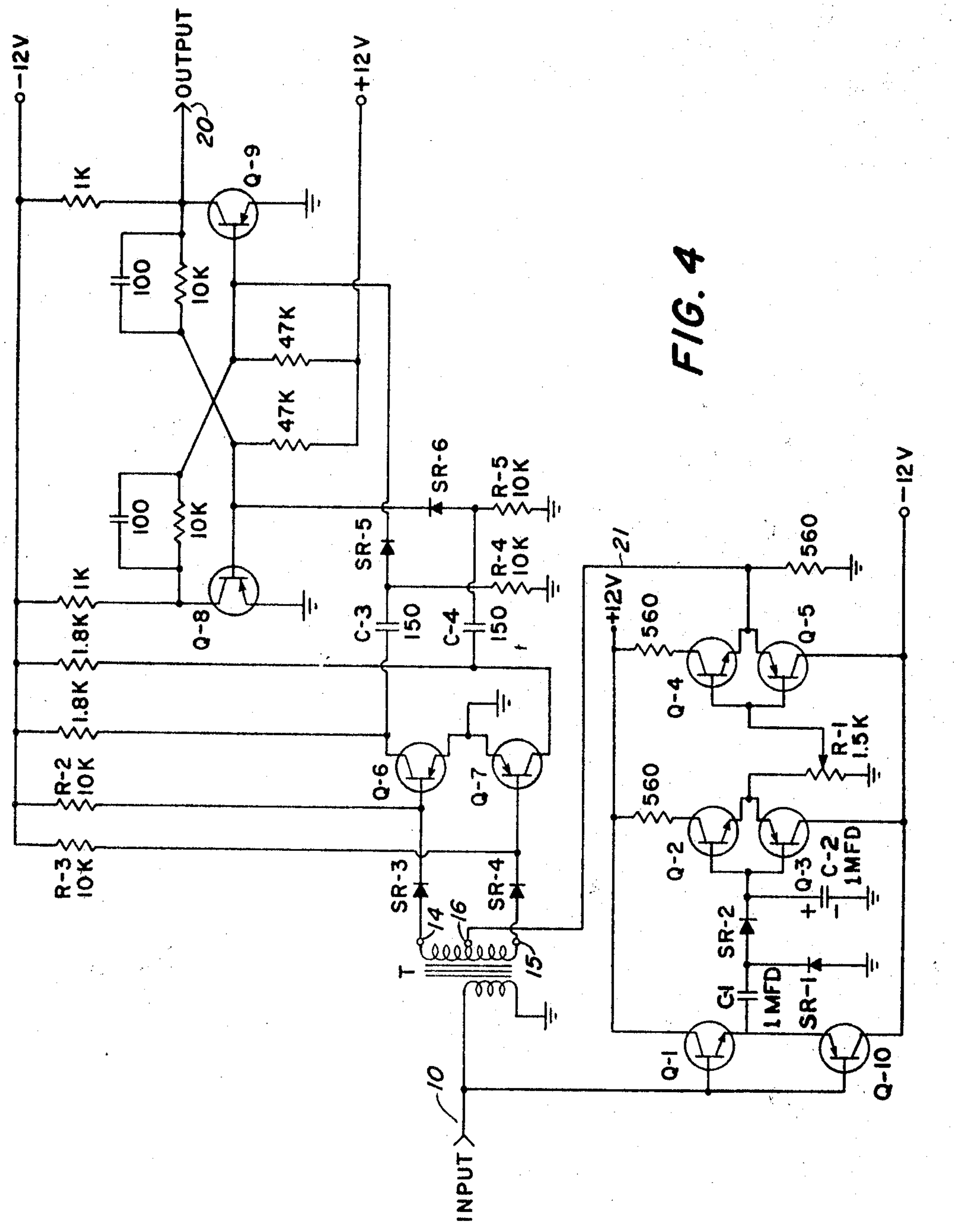
FIG. 4 is a schematic diagram of a decoder circuit according to my invention.

A specific detailed embodiment of the invention is shown in FIG. 4. In this embodiment, a conventional small pulse transformer T is employed as transducer 13 of FIG. 3. It is apparent that a transformer with a center tapped secdary will satisfactorily perform all the functions specified for transducer 13. The output terminals of transformer T have been numbered to correspond to the comparable terminals in FIG. 3. Input 10 is connected to the primary of transformer T and also to the base of emitter follower buffer transistors Q1 and Q10. The emitters of Q1 and Q2 are connected through diode SR1 to capacitor C1. SR1, SR2, C1 and C2 comprise a peak-to-peak rectifier. A peak-to-peak rectifier is generally preferred to other types, especially where an asymmetric waveform may be encountered. A resistor, not shown, may be connected across C2 if it is found desirable to reduce the naturally occurring holding time constant of the circuit. The peak rectified voltage appearing on C2 is transferred by a complementary symmetry emitter follower stage consisting of transistors Q2 and Q3 to a potentiometer R1 which is normally set so that its output voltage is about ¼ of its input. This is because a peak-to-peak rectifier produces a voltage of twice the normal peak-to-center value. The selected fraction of peak voltage appearing at the tap of R1 is transferred to the center tap 16 of transformer T by a further complementary symmetry emitter follower consisting of transistors Q4 and Q5 and by lead 21. The waveforms appearing at terminals 14 and 15 will therefore be the same as those shown in FIG. 3.

Terminal 14 is connected to the base of a transistor Q6 through diode SR3. The emitter of Q6 is connected to ground and the transistor is normally biased off by a positive current flowing from terminal 16 through diode SR3 and through base resistor R2, which is returned to the negative supply potential. When the potential at terminal 14 goes more negative than ground, transistor Q6 turns on and diode SR3 is biased off. The base current for Q6 is thereafter supplied by R2 until the voltage at terminal 14 again rises above zero and turns Q6 off. Accordingly, the collector potential of Q6 alternates between −12 volts and 0 volts, as the voltage at terminal 14 is greater than or less than 0. Q7, R3 and SR4 provide exactly the same level detecting function for terminal 15. It will be remembered, however, that the voltage on terminal 15 is out of phase with that on terminal 14. The Q6 collector voltage is differentiated by C3 and R4 and passed through diode SR5 to provide a single positive pulse every time the voltage at terminal 14 passes through zero in a negative-going direction. C4, R5 and diode SR6 perform the same function for Q7 and produce a single positive output pulse every time the voltage on terminal 15 passes through zero in a negative-going direction. The pulses from diodes SR5 and SR6 are connected to a flip flop circuit, composed of transistors Q8, Q9 and associated components, in a conventional manner so that a pulse from SR5 switches the flip flop to one of its two stable states and a pulse from SR6 switches it to its other stable state. It is also possible to provide a circuit configuration such that input signals are applied to one terminal only of the flip flop. An output terminal 20 may be connected to either of the flip flop transistors. The voltage appearing on this terminal is a two-level signal and is the desired recreation of the original binary signal of FIG. 1.

The present decoder is much simpler and more economical than prior designs requiring automatic gain control circuits. Furthermore, such automatic gain control circuits are difficult to construct in such a way that they will function satisfactorily at the higher frequencies now coming into use for long range digital communication. The present invention, however, operates very satisfactorily at and above the transmission rates employed in the so-called Telpak C service offered by telephone companies, and involving maximum pulse rates of about 240,000 per second.

The circuit of FIG. 4 may be constructed using the indicated component values and using 2N1305 transistors PNP transistors and 2N1304 NPN transistors. Where operation over a wide range of temperatures is required, silicon transistors may be employed or conventional temperature compensating schemes may be used. The circuit of FIG. 4 is shown for illustrative purposes only and radically different circuits may be used conforming only, however, to the functional principles previously set forth, and the following claims.

What is claimed is:

1. A decoder for decoding noise containing variable amplitude decode signals, comprising:

a transducer circuit with a pair of differential connected input terminals, first and second push-pull output terminals, and a neutral terminal determining the average potential of said output terminals, said input terminals being adapted for connection to a source of dicode signals;

first and second threshold circuits each having input and reference terminals, the input of said first circuit being connected to said first push-pull output terminal and the input of said second difference circuit being connected to said second push-pull output terminal;

a peak rectifier having input terminals adapted for connection to a source of dicode signals and having output terminals;

a voltage divider having a pair of input terminals connected to the output terminals of said peak rectifier and having first and second output terminals, one of said voltage divider output terminals being connected to said neutral terminal and the other being connected to said reference terminals, a first difference output terminal associated with said first difference circuit, a second difference output terminal associated with said second difference circuit, and a flip-flop circuit having set, reset, and output terminals, the set input being connected to one of said difference outputs and the reset input being connected to the other of said difference outputs, the output terminal of said flip-flop providing a two-level signal corresponding to the decoded version of said dicode signal.

2. A dicode signal decoder circuit comprising:

a peak rectifier for providing a peak rectified voltage proportional to the peak amplitude of said dicode signals;

a transformer having a primary winding adapted to be energized by said dicode signals and a secondary winding having a center tap and first and second outer taps;

means to apply said peak rectified voltage to said center tap;

and threshold detector means to detect the crossing of a fixed potential by said first and second outer taps, said peak detector including means for providing a peak rectified voltage equal to about one half of the peak voltage appearing between the center tap and either of said outer taps of said transformer.

3. A dicode signal decoder circuit comprising:

a transformer having a primary winding adapted to be energized by said decode signals and a secondary winding having a center tap and first and second end taps;

a peak rectifier for providing a peak rectified voltage equal to about ½ the peak voltage appearing between the center tap of said transformer and either of said end taps;

means to apply said peak rectified voltage between said center tap and ground;

and first and second comparison circuits connected to said first and second end taps respectively, each comparison circuit providing an output voltage of one value whenever its associated end tap is above ground potential and an output voltage of a second value whenever its associated end tap is below ground potential.

4. A dicode signal decoder circuit comprising:

a transformer having a primary winding adapted to be energized by said dicode signals and a secondary winding having a center tap and first and second end taps;

a peak rectifier for providing a peak rectified voltage equal to about ½ the peak voltage appearing between the center tap of said transformer and either of said end taps;

means to apply said peak rectified voltage between said center tap and ground;

and first and second pulse generators connected to said first and second end taps respectively, each pulse generator providing an output pulse whenever the voltage at its associated end tap passes through ground potential in a direction to increase the difference in potential between said end tap and said center tap.

5. The circuit of claim 4 further including a bistable circuit having set input, reset input and output terminals, said set and reset terminals being connected to said first and second pulse generators respectively, said output terminal providing a two-level signal constituting a decoded dicode signal.

References Cited

UNITED STATES PATENTS

| | | | |
|---|---|---|---|
| 3,054,003 | 9/1962 | Pagano et al. | 307—88.5 |
| 3,187,196 | 6/1965 | Corbell et al. | 307—88.5 |
| 3,287,570 | 11/1966 | Wilson | 307—88.5 |
| 3,188,486 | 6/1965 | Favin | 307—88.5 |
| 3,225,213 | 12/1965 | Hinrichs et al. | 307—88.5 |

JOHN S. HEYMAN, Primary Examiner

U.S. Cl. X.R.

307—209, 235, 261, 262, 268, 313; 328—109, 115, 118; 340—347